Figure 1:
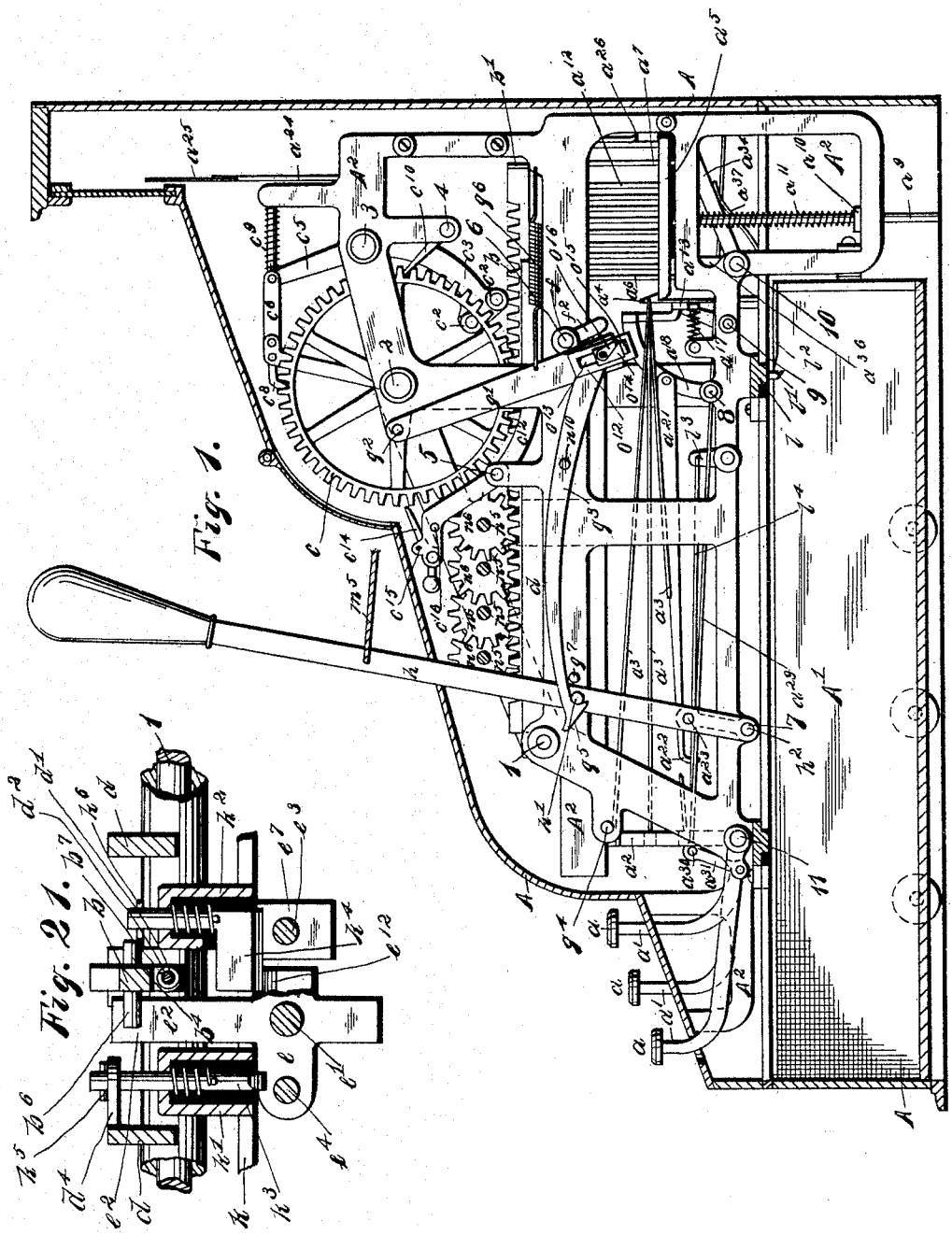

(No Model.)　　　　　　　　　　　　　　　　9 Sheets—Sheet 1.
H. M. NEER.
CASH REGISTER AND INDICATOR.

No. 491,020.　　　　　　　　　　　Patented Jan. 31, 1893.

WITNESSES:　　　　　　　　　　　　　　INVENTOR
　　　　　　　　　　　　　　　　　　　Harry M. Neer
　　　　　　　　　　　　　　　　　　BY
　　　　　　　　　　　　　　　　　　　ATTORNEYS (No Model.)     9 Sheets—Sheet 4.

H. M. NEER.
CASH REGISTER AND INDICATOR.

No. 491,020.                    Patented Jan. 31, 1893.

WITNESSES:
H. O. Baker
Frank Watt

INVENTOR
Harry M. Neer
BY
ATTORNEYS (No Model.) 9 Sheets—Sheet 5.

H. M. NEER.
CASH REGISTER AND INDICATOR.

No. 491,020. Patented Jan. 31, 1893.

WITNESSES:
H. O. Oster.
Frank Watt

INVENTOR
Harry M. Neer
BY Staley and Shepherd
ATTORNEYS (No Model.) 9 Sheets—Sheet 7.
H. M. NEER.
CASH REGISTER AND INDICATOR.
No. 491,020. Patented Jan. 31, 1893.
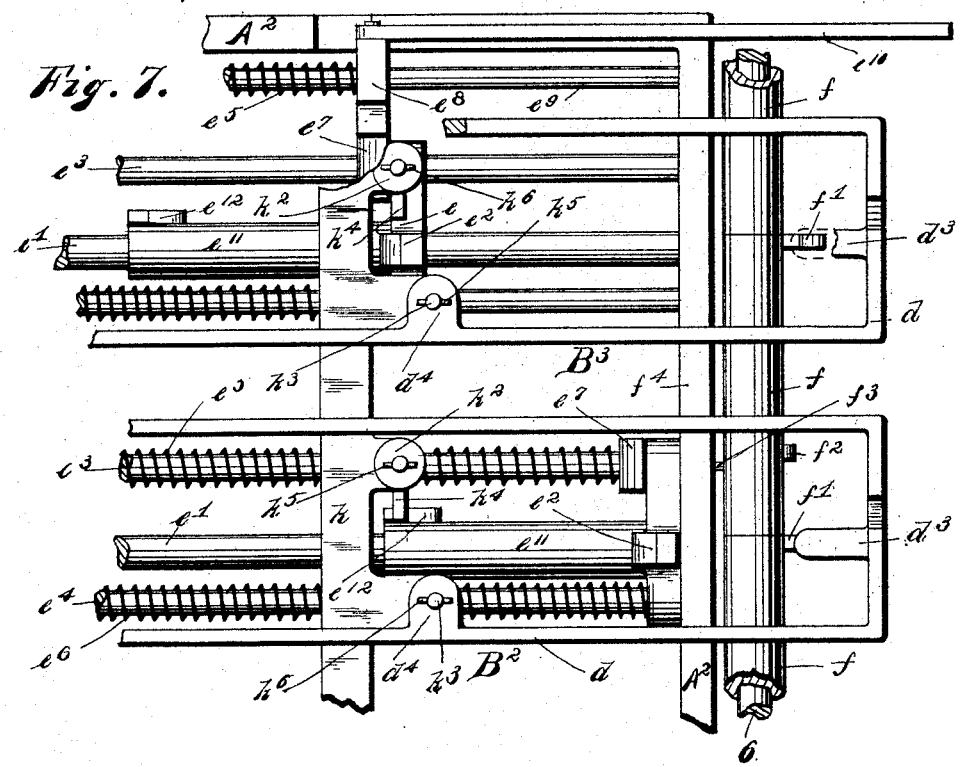
Fig. 7.
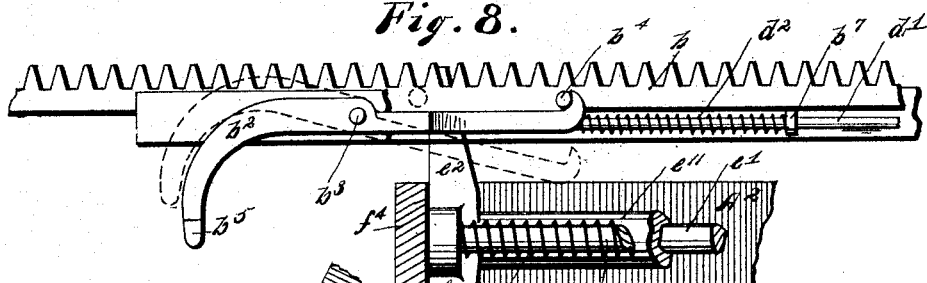
Fig. 8.
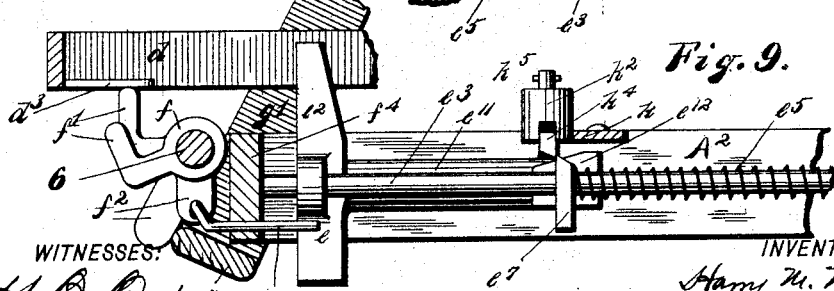
Fig. 9.
WITNESSES: INVENTOR
Harry M. Neer
BY 
ATTORNEYS (No Model.) 9 Sheets—Sheet 8.
H. M. NEER.
CASH REGISTER AND INDICATOR.
No. 491,020. Patented Jan. 31, 1893.
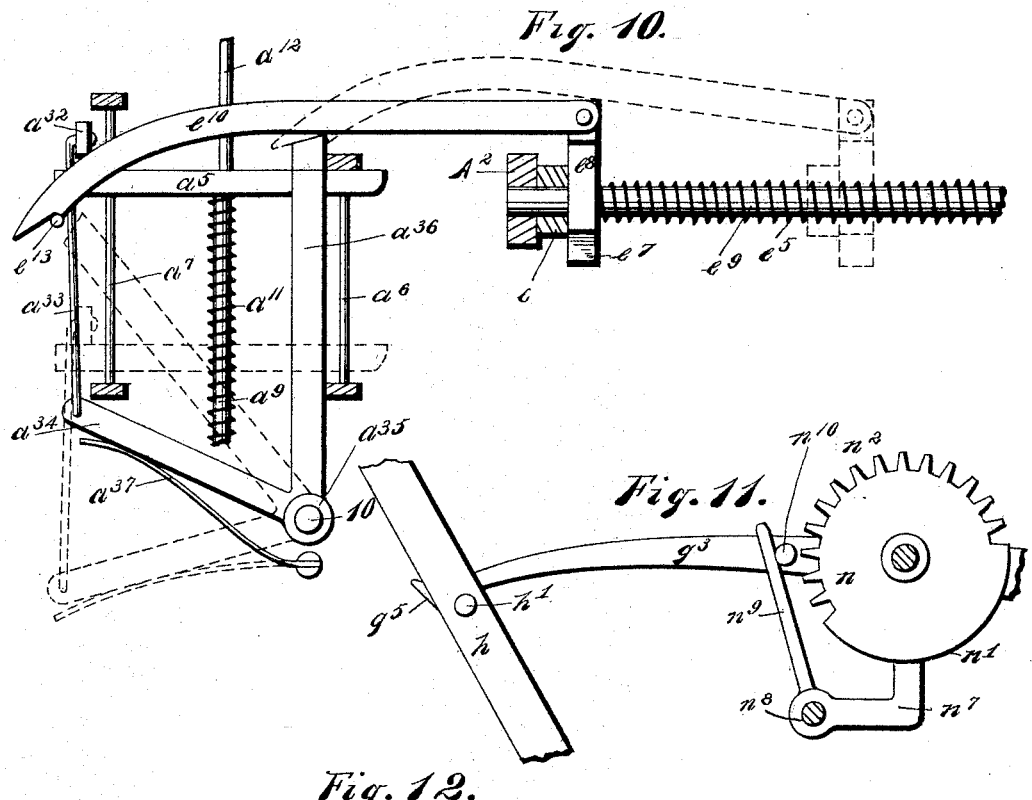
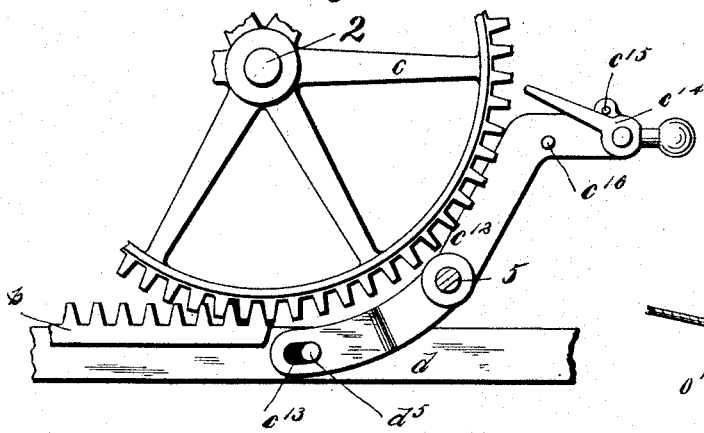
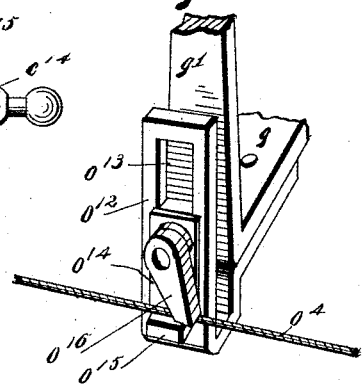
WITNESSES:
INVENTOR
Harry M. Neer
BY
ATTORNEYS (No Model.) 9 Sheets—Sheet 9.
H. M. NEER.
CASH REGISTER AND INDICATOR.

No. 491,020. Patented Jan. 31, 1893.

WITNESSES:
H. O. Oster.
Frank Watt.

INVENTOR
Harry M. Neer
BY
Shepherd
ATTORNEYS

UNITED STATES PATENT OFFICE.

HARRY M. NEER, OF SPRINGFIELD, OHIO, ASSIGNOR TO O. W. KELLY AND THOMAS REYNOLDS, OF SAME PLACE.

CASH REGISTER AND INDICATOR.

SPECIFICATION forming part of Letters Patent No. 491,020, dated January 31, 1893.

Application filed July 25, 1892. Serial No. 441,164. (No model.)

*To all whom it may concern:*

Be it known that I, HARRY M. NEER, a citizen of the United States, residing at Springfield, in the county of Clark and State of Ohio, have invented certain new and useful Improvements in Cash Registers and Indicators, of which the following is a specification.

My invention relates to that class of cash registers and indicators having a series of keys and indicators arranged in series, one indicator for each key, together with registering devices, one registering device for each series of keys; the parts being so arranged that when one or more keys are depressed the entire amount represented by said keys will be indicated in the proper numerical order by the indicators.

My invention further relates to improvements in the devices shown in my Letters Patent No. 476,295, dated June 7, 1892, and my pending application Serial No. 412,021, filed November 16, 1891.

The object of my invention is to provide in this class of machines an improved means for operating the registering devices.

A further object of my invention is to provide improved means by which each amount registered and indicated is printed on a ticket or check.

A further object of my invention is to provide improvements in the registering devices, whereby the amounts in one device and of one denomination are transferred positively to the amounts in the other devices, thus producing a total adding machine.

A further object of my invention is to improve on the general constructions of the machines heretofore employed for this purpose.

My invention consists in the various constructions and combinations of parts hereinafter described and set forth in the claims.

Figure 2:
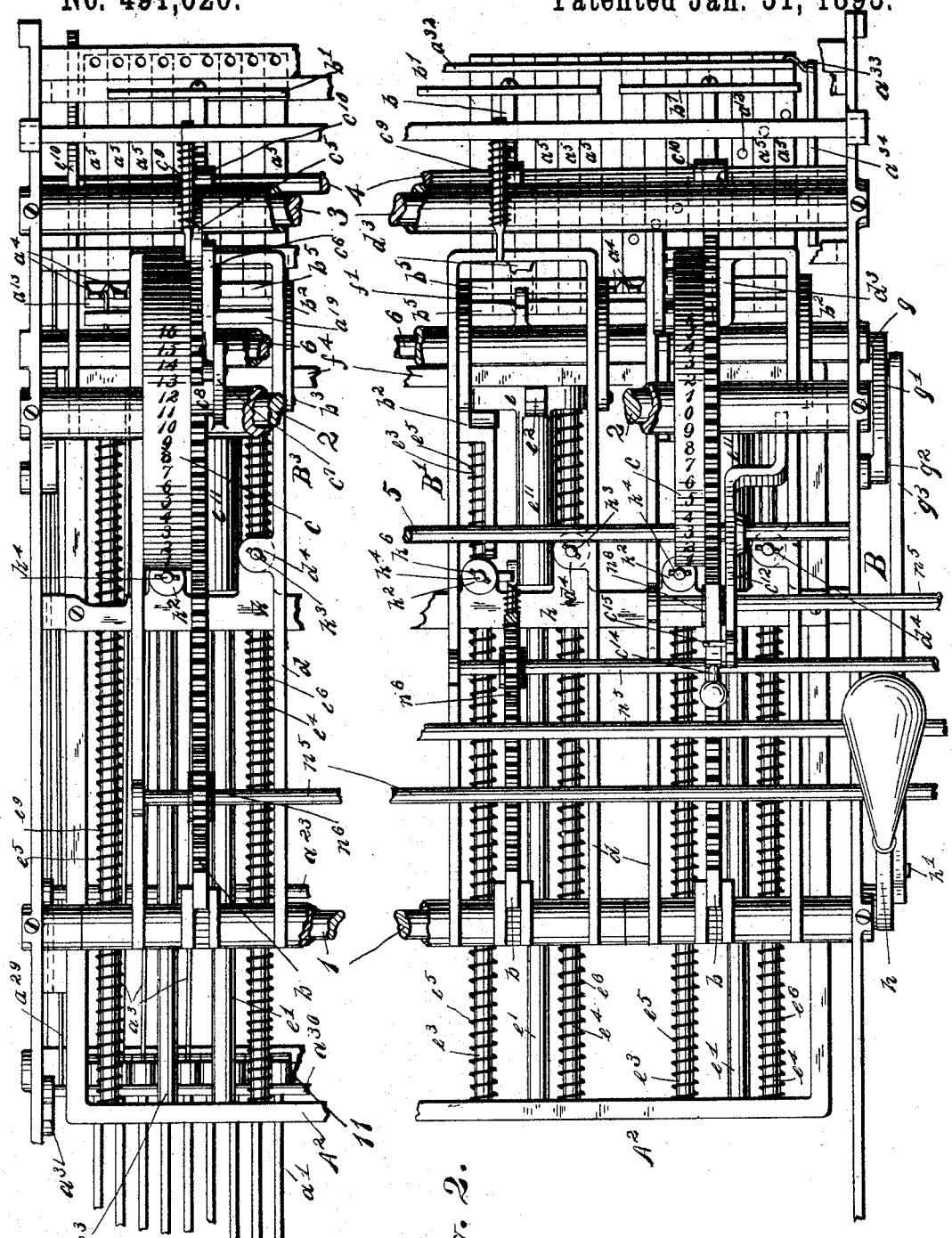
Figure 3:
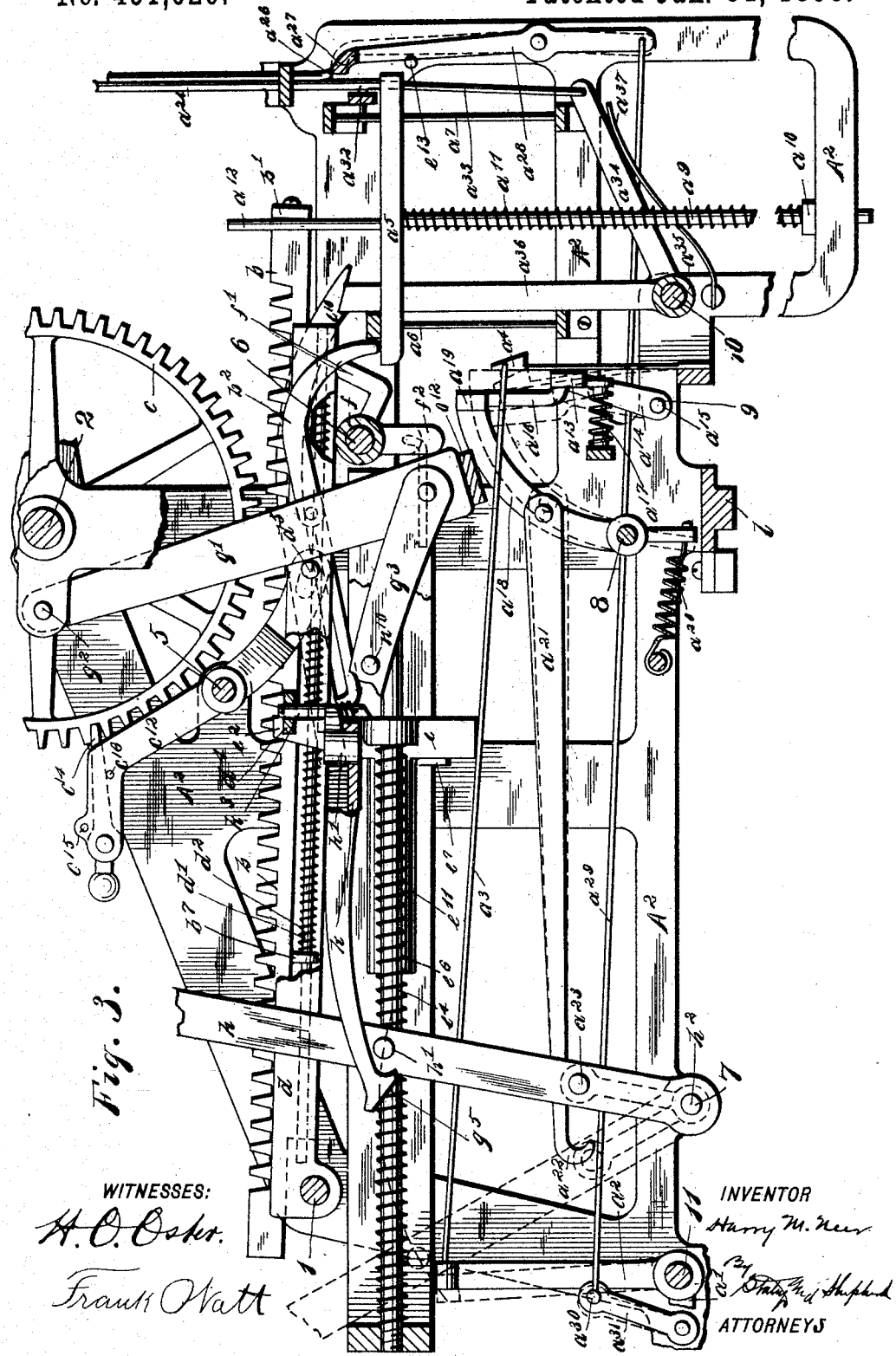
Figure 4:
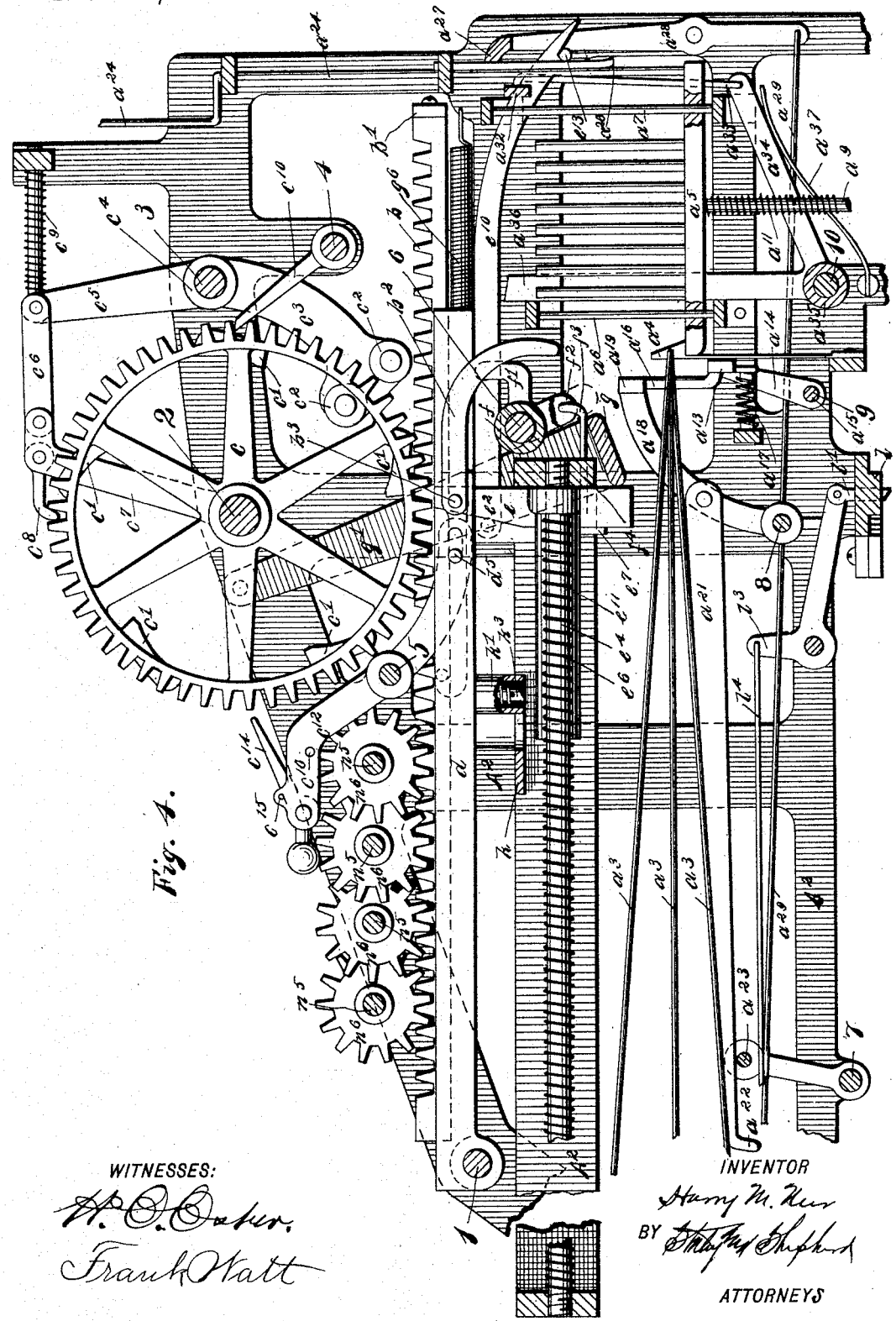
Figure 5:
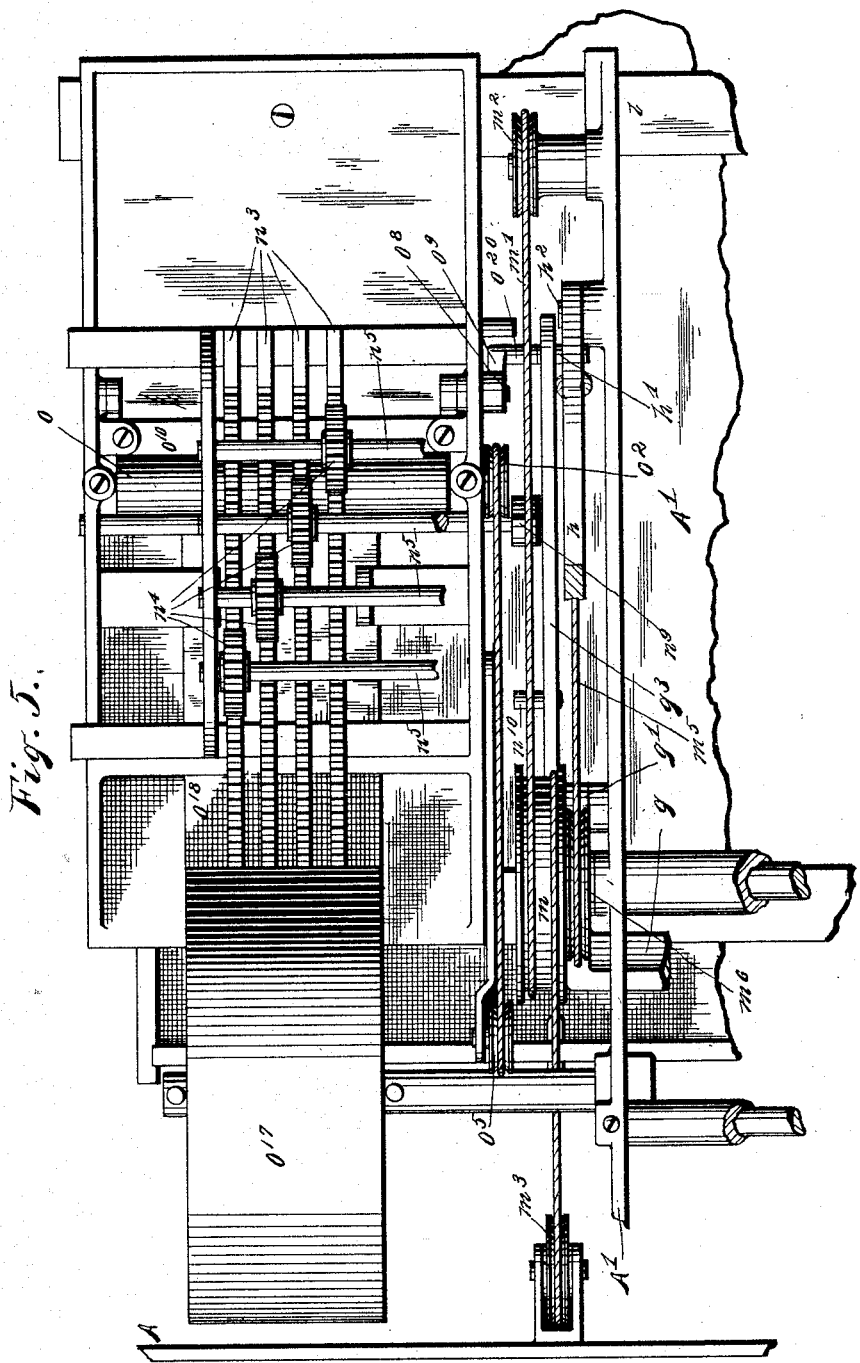
Figure 6:
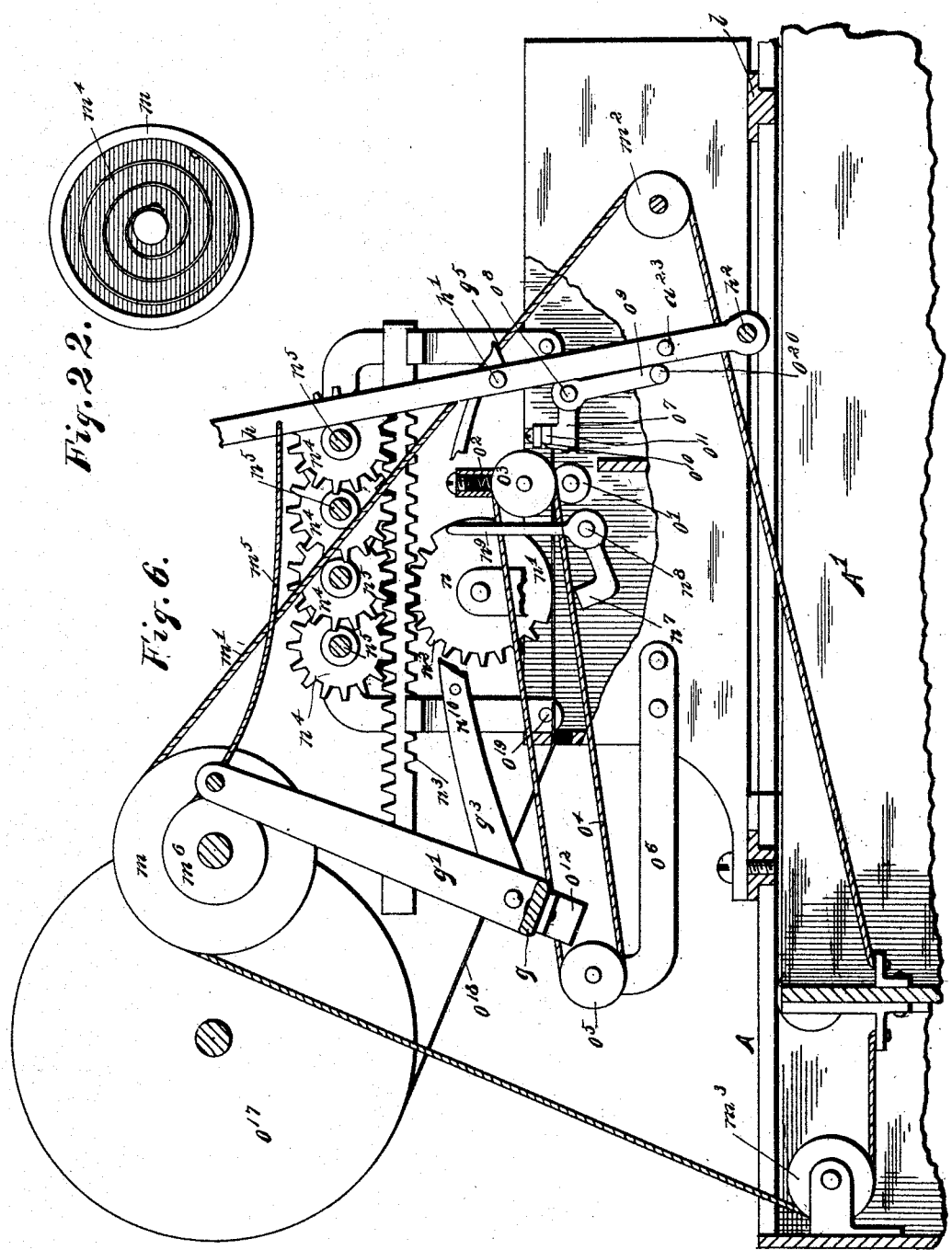
Figure 18:
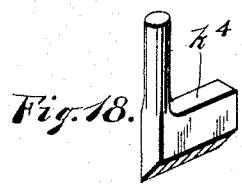
Figure 19:
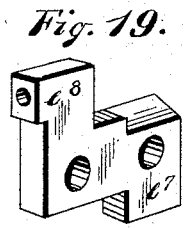
Figure 20:
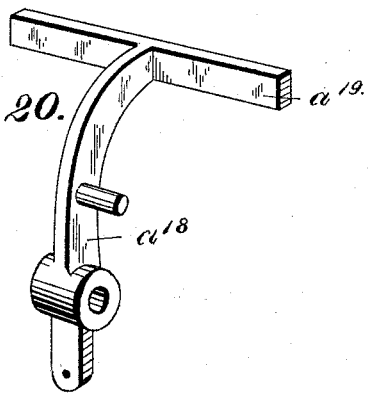
Figure 17:
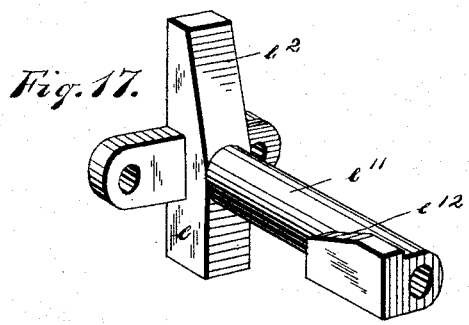
Figure 16:
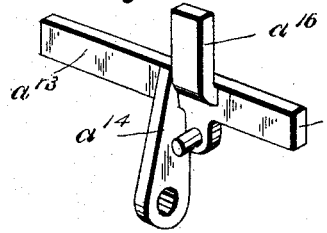
Figure 15:
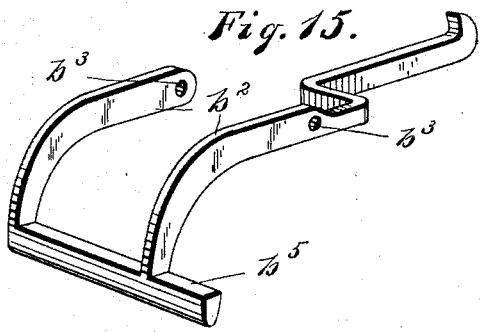
Figure 14:
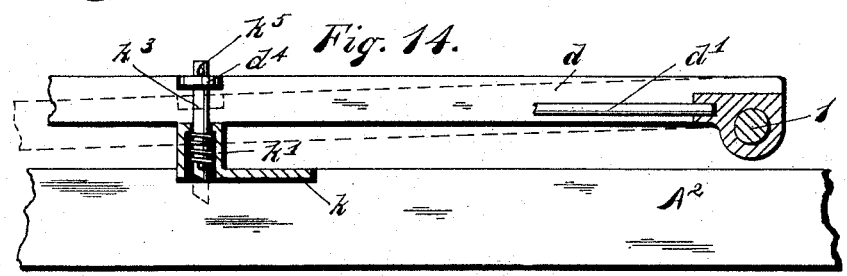

In the accompanying drawings Figure 1 is a sectional elevation view of a device embodying my invention, the section being taken between the register proper and the printing or check device, which latter occupies a position on the extreme right of the machine. Fig. 2 is a plan view of the same with the casing removed and some of the parts being broken away, the check device being also omitted. Fig. 3 is an elevation, partly in section, of the registering devices, some of the frame work and operating parts being broken away to better illustrate the operations. Fig. 4 is a sectional elevation view taken on a different vertical plane from Fig. 1. Fig. 5 is a plan view of the printing or check device. Fig. 6 is an elevation, partly in section, of the same. Fig. 7 is a plan view in detail of a portion of the registering mechanism. Figs. 8 and 9 are respectively an elevation and sectional view of a portion of the same. Fig. 10 is a detail view showing the devices for returning the indicators and a portion of the registering mechanism to their normal positions. Fig. 11 is a detail view of a portion of the printing or check device. Fig. 12 is a detail view showing the locking devices for the registering wheels, to prevent the same from turning beyond the amount indicated by the depressed key. Fig. 13 is a detail view of the printing or check device. Fig. 14 is a detail view, partly in section, illustrating the releasing devices of the registering mechanism. Figs. 15 to 20, inclusive, are detail views of some of the various parts of the registering mechanism, which will be hereinafter more fully referred to. Fig. 21 is a transverse sectional view of the rack frame, showing the releasing pawls. Fig. 22 is a detail view showing the spring for actuating the drawer.

Like parts are represented by similar letters and figures of reference in the several views.

In the said drawings A A, represent the outer casing which contains at the bottom the cash drawer A', and the main frame $A^2 A^2$, of the registering and indicating mechanism. The frame $A^2 A^2$, consists essentially of side plates or frames connected by transverse rods numbered respectively, 1, 2, 3, 4, 5, 6, 7, 8, 9 10 and 11, on which a large number of the operating parts are supported and operated.

In the present device, as in those in my former patent and application referred to, there are nine keys in each series, each adapted to control a stop-pin which acts in connection with a reciprocating rack, adapted, when moved in one direction, to engage with a registering wheel and move said wheel a number of notches or spaces corresponding to the key which controls its stop-pin. The registering devices and their controlling keys are each substantial duplicates one of the other and any number may be used. A description of one set of devices, therefore, will be sufficient to afford a clear understanding of all of them, a further detailed description being given of some of the connecting parts and of intermediate dependent devices which serve to connect the respective registering devices and assist in the operations of two or more of said devices.

The keys $a$, are each made in the form of a bell-crank lever, one arm of which is curved to form a stem $a'$, the said keys being all journaled on the frame rod 11, and each provided with a vertical arm $a^2$, to the upper extremity of which is connected a rod or wire $a^3$. The outer curved portions $a'$, of the respective keys are of different lengths, so that the keys may be arranged in order in less space than if they were all arranged in one row; the projecting arms $a^2$, of the respective keys are also made of different lengths so that the movement of the respective connecting wires or rods $a^3$, will be uniform. Each of the rods $a^3$, is connected to a spring catch $a^4$, which normally engages with a cross bar, $a^5$, which is pierced near the extremities to receive guide rods $a^6$ $a^7$, on which said bar is adapted to slide. Each of the said bars $a^5$, is further provided with a downwardly projecting rod or stem $a^9$, which passes through a suitable bearing $a^{10}$, in a cross bar common to all the series, and is surrounded by a spring $a^{11}$, which presses at one end against the bearing $a^{10}$, and at the other against the cross bar $a^5$, so that when the said bar is released by the spring catch $a^4$, it will be elevated along the guide rods $a^6$, $a^7$. Each of the cross bars $a^5$, carries an upwardly projecting stud or pin $a^{12}$, the pins in the respective bars of each series being arranged in successive order, so that each succeeding pin is slightly back of the preceding one. Arranged vertically above each series of stop-pins thus formed is a reciprocating registering rack $b$, having a T-shaped head $b'$, at its rear extremity. As each of the cross bars $a^5$, with its projecting stop-pin is released, by the depression of its key and elevated by the spring connected thereto, it comes within the line of travel of the T-shaped head $b'$, of the rack $b$, and serves to limit the movement of said rack by contacting with said T-shaped head.

Each of the racks $b$, is normally in engagement with a registering wheel $c$, which is provided with peripheral teeth corresponding to the teeth in the rack $b$. The racks $b$, are each supported by and adapted to slide in a pivoted frame $d$, journaled at one end on the frame rod 1, and are held against longitudinal movement by a pivoted U-shaped catch $b^2$, which is pivoted at $b^3$, to each side of the frame $d$, and has a hooked-shaped projection adapted to engage with a pin $b^4$, on the side of the rack. (See Figs. 8 and 15 for detail.)

This pivoted catch $b^2$, is provided with a cross bar $b^5$, arranged above and across the entire series of sliding bars $a^5$, which carry the stop-pins, so that any bar of the series, when released, contacts with said catch and turns the same on its pivotal bearings so as to release the pin $b^4$, as shown in Fig. 3 and in dotted lines in Fig. 8, and thus release the rack $b$. Immediately under the rack and its pivoted frame is a reciprocating cross head $e$, adapted to slide on a supporting rod $e'$, secured at each end in the main frame. This cross head $e$, has an upwardly projecting spur $e^2$, which rests in contact with a pin $b^6$, on the rack $b$, and projecting therefrom on the opposite side from the pin $b^4$, as shown in Fig. 21 and in dotted lines in Fig. 8. Directly under the rack $b$, and parallel therewith is a guide rod $d'$, which is supported at each end in the ends of the rack frame $d$, and forms a part thereof. The rack is provided with a downwardly projecting lug or spur $b^7$, which is pierced to receive the rod $d'$, and slide thereon. A spring $d^2$, surrounding the rod $b'$, and resting at one end against the end of the rack frame and at the other against the projecting lug $b^7$, serves to move the rack longitudinally toward the front of the machine when the rack is completely released, but this only takes place when the cross head $e$, is moved toward the front of the machine, in the manner hereinafter specified, and not then unless the catch $b^2$, has been operated, as described, to release the pin $b^4$. When thus released, as will hereinafter appear, the rack is moved toward the front of the machine by the spring $d^2$, until the T-shaped head thereon contacts with the stop-pin which has been elevated by the depression of a key. The respective stop-pins connected to the respective keys of a series, being arranged in successive order from front to rear, furnish the means for determining the movement of the reciprocating rack and thus the movement of the registering wheel which engages with the said rack, as will hereinafter more fully appear.

Each of the rack frames $d$, is provided at the rear with an inwardly projecting lug $d^3$. Immediately under the rack frame is a sleeve $f$, arranged on the frame rod 6. This sleeve has an upwardly projecting curved finger $f'$, immediately under the projecting lug $d^3$, on the rack frame. This sleeve $f$, extends along the rod 6 from a point at or near the center of one rack frame until it contacts with the next succeeding sleeve of the next rack frame, and each of said sleeves is provided with a downwardly projecting finger $f^2$, all of which, except the first in the series, are provided with forwardly projecting pins $f^3$, passing through a suitable opening in a cross bar $f^4$, of the main frame. (See Fig. 9 for detail.)

Extending across the frame immediately below the respective racks and their frames is a bar $g$, having at each end upwardly extending arms $g'$, which are pivoted at $g^2$, at each side of the main frame, so that the said bar is adapted to swing on the said arms and across the entire frame and below the rack bars. Pivoted to one of the arms $g'$, is a forwardly extending hook $g^3$, adapted to engage with a projecting stud or pin $h'$, on a hand-lever $h$, pivoted at $h^2$, to the main frame and projecting upwardly through the outer casing A A. The swinging bar $g$, is adapted to contact with the projecting finger $f^2$, on the sleeve $f$, of the registering mechanism for the first series only, that is to say the units device. This bar $g$, is held in the normal position as shown in Figs. 3 and 4, by contacting with the cross heads $e$, of the respective registering devices, the bar in turn, resting against the projecting finger $f^2$, causes the projecting finger of the sleeve $f$, to engage with the rack frame and thus hold the rear end of the rack frame elevated, so as to bring the rack $b$, in mesh with the registering wheel $c$. A forward movement of the handle $h$, by reason of the engagement of the hook $g^5$, with the pin $h'$, produces a forward movement of the bar $g$, which releases the rack frame of the unit series and permits the rear end of said frame to drop down until the rack $b$, is out of mesh with the registering wheel $c$. The same result is secured in each of the other registering devices, though in a slightly different manner, as will be hereinafter more fully explained. A forward movement of the bar $g$, produces a forward movement of the respective cross heads $e$, with which they contact. On each side of the rod $e'$, are spring supporting guide rods $e^3$ $e^4$, each of which passes through the cross head $e$. Springs $e^5$ $e^6$, on these respective rods $e^3$ $e^4$, press against the cross head $e$, and tend to move it toward the rear of the machine in opposition to the movement of the cross bar $g$, when operated by the handle $h$. The spring $e^6$, on the rod $e^4$, bears directly on the cross head $e$, while the spring $e^5$, on the rod $e^3$, rests against an intermediate shoe $e^7$, sliding loosely on the rod $e^3$, independent of the cross head $e$. This shoe $e^7$, in its normal position is pressed against the cross head $e$, by the spring $e^5$, and in this position contacts with the projecting pin $f^3$, connected to the finger $f^2$, of the sleeve $f$, which causes said sleeve to be turned on the frame rod 6, until the projecting finger $f'$, of said sleeve, bears against the lug $d^3$, of the rack frame, and elevates said frame to a horizontal position, bringing the rack into engagement with its registering wheel. This construction applies to all the registering devices except the first, which, as before stated, is operated to hold the rack frame in a horizontal position by the direct contact between the bar $g$, and the projecting finger $f^2$.

Arranged on a cross bar $k$, of the main frame $A^2$, are small housings $k'$, $k^2$, which contain respectively spring actuated catches $k^3$ $k^4$. The spring actuated catch $k^3$, is extended upwardly through its housing $k'$, and passes through a projecting lug $d^4$, on the rack frame $d$; a cross pin $k^5$, passing through the upper end of said catch being adapted to limit the downward movement of the spring pressed catch through the said lug and housing. The spring catch $k^4$, is provided with a similar pin $k^6$, adapted to contact with the top of its housing and limit the movement against the action of its spring. These respective spring catches $k^3$ $k^4$, are adapted, as the cross head $e$, is moved backwardly, by the operation of the hand lever $h$, as before described, to engage respectively with said cross head and with the shoe $e^7$, and hold said parts in this position with the respective springs $e^5$ $e^6$, under tension. As the swinging bar $g$, the cross head $e$, and the shoe $e^7$, are thus moved backwardly, by the operation of the handle $h$, the respective rocking sleeves $f$, are released and permit the rack frames to drop down at the rear, swinging on the frame shaft 1, until the rack $b$, is out of mesh with the registering wheel $c$. When this operation takes place, if there has been a key depressed in that series belonging to any registering device, the rack in said registering device, having been released by the pivoted catch $b^2$, moves backwardly by the action of the spring $d^2$, until it contacts with its stop-pin, as before described.

To provide for locking all the remaining keys in a series when one key is depressed I employ in front of each series of the spring catches $a^4$, a swinging bar $a^{13}$, having a downwardly projecting arm $a^{14}$, pivoted to the frame rod 9 at $a^{15}$, and having an upwardly projecting finger $a^{16}$, said bar being normally pressed against all the spring catches of the series by a spring $a^{17}$. Pivoted on the frame rod 8, in front of each series of spring catches $a^4$, is a curved arm $a^{18}$, having at its outer extremity a cross bar $a^{19}$, which I term the locking bar. This bar normally rests on top of the finger $a^{16}$, of the pivoted bar $a^{13}$. When any spring catch $a^4$, is withdrawn by the depression of a key the bar $a^{13}$, is moved therewith until the locking bar $a^{19}$, clears the finger $a^{16}$, which permits said bar to drop down in front of and in contact with the remaining spring catches $a^4$, the movement of the bar being facilitated by the action of a spring $a^{20}$, connected at one end to the main frame and at the other to an extension of the curved arm $a^{18}$. (See Figs. 3, 16 and 20.) Pivoted to each of the curved arms $a^{18}$, is a forwardly extending link $a^{21}$, having a hook-shaped end $a^{22}$, adapted to engage with a transverse bar $a^{23}$, connected at one end to the hand-lever $h$, and supported at the opposite end by a pivoted arm,—this bar extending entirely across the frame so as to engage the hook-shaped link $a^{21}$, of each registering device. The result of this construction is that a forward movement of the lever returns the locking bars to their normal position in the operation of registration, as will more fully appear hereinafter.

Resting on each of the spring actuated cross bars $a^5$, which carry the stop-pins for the respective registering racks, is an indicator stem $a^{24}$, which carries at its upper end an indicator $a^{25}$, with a number corresponding to the number on the key depressed. The depression of a key, therefore, through the operation of the spring actuated cross bar, causes the indicator, corresponding to said key, to be elevated. Each of the indicator stems is provided with a projecting shoulder $a^{26}$, adapted, when elevated, to be engaged by a pivoted cross bar $a^{27}$, which extends across the entire series of indicator stems. Each of the cross bars $a^{27}$, is supported on a pivoted arm $a^{28}$, which is extended below its pivotal point and connected by a connecting rod $a^{29}$, to a transverse bar $a^{30}$, supported on pivoted arms $a^{31}$, immediately in front of the arms $a^2$, of the key levers the bar $a^{30}$, extending entirely across the machine and supported by the arms $a^{31}$, which are pivoted to the opposite sides of the frame. Means are thus provided by which any indicator in a series, which has been previously elevated, is released and drops to its normal position as soon as another key in that series is subsequently depressed.

Arranged above the respective cross bars $a^5$, and extending transversely entirely across the machine, is an operating bar $a^{32}$, connected at each end by link connections $a^{33}$, to pivoted levers $a^{34}$, journaled on the frame rod 10, and connected by a sleeve $a^{35}$. This sleeve is provided at one end with an upwardly projecting arm $a^{36}$. The shoe $e^7$, in the last series of registering mechanism, i.e. the one on the extreme left, when facing the machine, is provided with an extension $e^8$, which is perforated to receive a rod $e^9$, in the main frame, parallel with its other supporting rod $e^3$. This extension $e^8$, is provided with a pivoted arm or lever $e^{10}$, which extends rearwardly and is adapted to engage the upper end of the projecting arm $a^{36}$, as shown in Fig. 3. The spring $e^5$, which operates this shoe is preferably placed on the rod $e^9$, instead of the rod $e^3$, though this is immaterial. The operation of the shoe is the same as those in the other series, as will hereinafter more fully appear.

Immediately above the drawer A', is a cross bar $l$, forming a part of the main frame, perforated at each side to receive small reciprocating catches $l'$, adapted to project into the drawer A', and engage with suitable engaging stops $l^2$, on the respective sides of said drawer. These catches $l'$, are pivoted to the outer end of a bell-crank lever $l^3$, the opposite end of which is connected by a connecting rod $l^4$, to the cross bar $a^{30}$, located in front of the respective key lever-arms, so that a depression of any key in any series causes the drawer to be released by said catches, and when so released is opened by a spring actuated mechanism, as will hereinafter more fully appear.

Each registering wheel $c$, (except perhaps the last) in the series, from right to left, is provided at one side and at suitable intervals about its periphery with cam-projections $c'$, adapted to operate between rollers $c^2$ $c^2$ on a pivoted arm $c^3$, which is formed integral with a sleeve $c^4$ on the frame rod 3, said sleeve being provided at its opposite extremity with a projecting arm $c^5$, which is connected by a link $c^6$, to a vibrating arm $c^7$, journaled on the frame rod 2, concentric with the registering wheel. This arm $c^7$, is provided with a pivoted pawl $c^8$, adapted to engage in the teeth of the next succeeding registering wheel. The cam projections $c'$, are so placed upon each registering wheel that when the registering wheel of one series is moved ten teeth or notches, the cam projection thereon moves the lever $c^5$, and thus causes the pawl $c^8$, to move back one notch or tooth of the registering wheel of the next succeeding series, so that when the cam projection $c'$, has passed the roller $c^2$, the succeeding registering wheel is moved one notch by a spring $c^9$, which operates against the pivoted arm $c^5$, and returns the parts to their normal positions when released by the cam projections. As before stated the racks $b$, are normally in engagement with the registering wheels and remain in this position except for a limited period during the operation of registrating, so that the registering wheels are at all times held against movement in either direction. Each wheel is further held against backward revolution by a pivoted pawl $c^{10}$, on the frame rod 4. During the operation of registering, however, these racks are dropped down out of engagement with the registering wheels while they are being moved to a position regulated by the stop-pins attached to the keys, as before described. To each of the rack frames, except the first one in the series, or the one to the extreme right, has connected thereto a pivoted lever $c^{12}$, provided with a slotted opening $c^{13}$, which engages with a pin $d^5$, on the rack frame $d$. The opposite end of the pivoted lever $c^{12}$, is provided with a pivoted and weighted pawl $c^{14}$, having a limited movement between stop-pins $c^{15}$, $c^{16}$. As the rack frame is released and drops down to bring the rack out of mesh with the registering wheel the pawl $c^{14}$, is inserted between the teeth of the wheel, and during the period that the rack is out of engagement with the wheel said wheel can move one notch only, which will bring the pawl in contact with the stop-pin $c^{16}$, and hold the wheel positively against further movement; at the same time the pawl $c^{10}$, will, as the wheel is advanced, engage in the teeth, and thus prevent a movement of said wheel in either direction, until released by the upward movement of the rack frame, which withdraws the locking pawl $c^{14}$, from engagement with the teeth in the said wheel.

In registering any desired amount on the device, the keys representing this amount are depressed, the different denominations to be registered, such as dollars, dimes and cents, being indicated on the different series of keys. The depression releases its stop-pin, which is elevated by the spring connected therewith, which also elevates the indicator corresponding therewith. The hand-lever $h$, is then drawn forwardly, which, as before described, operates through the medium of the hinged cross bar $g$, to drop the racks from engagement with the registering wheels and at the same time move the spring actuating cross heads and the intermediate shoes until they are engaged by the respective spring catches $k^3$ $k^4$. The racks corresponding to the series in which a key has been depressed, are at the same time moved until they contact with the stop-pins. It will be seen that the actuating cross heads of all the series and the intermediate shoes are moved by the action of the hand-lever, i. e. until they engage with the spring catches $k^3$ $k^4$. The racks, on the contrary, or those that have been released by the action resulting from a depressed key, move only a distance determined by the position of the stop-pin which corresponds to the key depressed. Projecting from the main frame in the line of travel of the hand-lever $h$, and of the hook $g^3$, is a projecting stud $g^4$, adapted, as the handle approaches the limit of its movement, to engage with the beveled end $g^5$, of the hook $g^3$, and thus force said hook out of engagement with the pin $h'$, thus releasing the swinging bar $g'$, which is returned to its normal position by springs $g^6$, connected at one end to the respective arms $g'$, and at the other to the main frame. As the swinging arm returns to its normal position the hook $g^3$, rests on and is guided by a projecting stud $g^7$, on the frame, which prevents it from dropping down and retains it in a position to be engaged by the pin $h'$, when the hand-lever is returned. As the bar $g$, is returned to its normal position it contacts with the finger $f^2$, of the first registering mechanism, causing said finger to be moved back to its normal position, and, through the medium of the sleeve $f$, and finger $f'$, raises the rack frame and rack until the rack engages with the registering wheel. The upward movement of the rack frame withdraws the spring catch $k^3$, from engagement with the actuating cross head $e$, which, by the tension of the spring, is moved forward until it contacts with the pin $b^6$, on the rack $b$, and carries said rack back to its normal position, thus moving the registering wheel a number of notches corresponding to the key depressed.

It will be understood that during the movement of the registering rack of the first or units register the racks of the other registers will be disengaged from the registering wheels. Each of the cross heads, however, is provided with an extended sleeve $e^{11}$, having on one side a beveled or cam-shaped block $e^{12}$, adapted, as the cross head $e$, approaches the limit of its movement, to contact with and raise the spring catch $k^4$, which is extended laterally for this purpose, and elevate said spring catch, thus releasing the intermediate shoe $e^7$, which is moved by the spring $e^5$, into contact with the projecting pin $f^3$, of the oscillating sleeve $f$, of the next register, thus raising its rack frame, when the operation is repeated through all the registering devices, the registration of each being completed before that of the next succeeding one begins.

When the drawer is released by the depression of any key, as before described, it is opened by means of a spring actuated drum $m$, acting on a cable $m'$, which passes around said drum thence around suitable supporting pulleys $m^2$, $m^3$, and is connected at each end to the drawer $A'$. (See Fig. 6.) The drum $m$, contains a spring $m^4$, which is normally under tension and operates to open said drawer when released by its retaining catches. The drawer is returned to its normal position within the casing and its operating spring placed under tension by the movement of the handle $h$, through the medium of a cord $m^5$, connected at one end to said handle and at the other to a spool or sheave $m^6$, on the side of the drum $m$, so that as the drawer is opened the cord $m^5$, is wound by the sheave $m^6$, so that a forward movement of the handle will produce a backward movement of the drawer. The drawer is thus opened by the act of depressing a key and returned by the act of registering the amount thus indicated.

To provide for printing the amount of each purchase or registration on a ticket or check, I employ a printing wheel $n$, for each registering device, said wheel being provided on a portion $n'$, of its periphery with figures from 1 to 9, and the remaining portion of its periphery being provided with teeth $n^2$, adapted to engage in a rack $n^3$, which reciprocates in a suitable frame above said printing wheel. (See Figs. 5, 6 and 11 for detail.) These printing wheels are preferably arranged on the extreme right of the machine, each rack $n^3$, being provided with teeth on both sides thereof, the teeth on the upper side being adapted to be engaged by a pinion $n^4$, connected by a suitable shaft $n^5$, to a pinion $n^6$, which engages with the registering rack of the register to which it is connected. The pinions $n^5$, are in mesh with the registering racks at all times, so that the printing wheels $n$, always maintain the same relative positions with reference to said racks, and the number on the printing wheel corresponding to the number on the key depressed is moved to the bottom of said wheel whenever the registering rack is released and moved to the position for registration.

Immediately in front of the printing wheels $n$, are feeding rolls $o$ $o'$, the upper one of which is preferably journaled in slotted bearings with openings $o^2$, which permit a yielding movement thereof. The upper roller $o$, is provided on one end with a sheave $o^3$, around which passes an endless cord or cable $o^4$, which also passes about a stationary supporting sheave $o^5$, journaled on a suitable bearing arm $o^6$, connected to the frame. In front of the feeding rolls $o$, $o'$, is an oscillating knife head $o^7$, journaled at $o^8$, and provided with an extended arm $o^9$. This knife head carries a cutting blade $o^{10}$, which operates in connection with a stationary block $o^{11}$. To the lower extremity of the swinging arm $g'$, of the cross bar $g$, is connected a pawl supporting frame $o^{12}$, having a slotted opening $o^{13}$, (see Figs. 1 and 13) in which is seated a sliding block $o^{14}$, carrying a projecting block or step $o^{15}$, over which the cord or cable $o^4$, is adapted to pass, and provided above said step or block with a pivoted catch $o^{16}$, adapted, in connection with said cord or cable, to engage said cable $o^4$, when moved in one direction and to move freely thereon when moved in the opposite direction. Mounted in suitable bearings in the main frame is a paper roll $o^{17}$, over which a paper strip or ribbon $o^{18}$, passes over a suitable guiding rod $o^{19}$, under the respective printing wheels $n$, and between the feeding rolls $o$ $o'$. Immediately under the printing wheels $n$, is a pivoted bar or platen $n^7$, mounted on a suitable journal $n^8$, adapted to be engaged by a stud $n^{10}$, in the hook $g^3$, as the hand-lever $h$, is moved to its forward position and thus bring the pivoted bar or platen $n^7$, in contact with the paper strip immediately below the numbers on the printing wheels $n$. The numbers on the periphery of the printing wheels are preferably made of steel with a sharp face, so that the pressure of the bar $n^7$, exerted through the hand-lever $h$, produces an impression of the numbers in the paper without the use of ink, though the same result may be attained by providing the usual inking rolls and printing the numbers in ink in the same manner. It will be understood that the printing of the ticket or check is accomplished on the forward or outward movement of the hand-lever, and prior to any movement of the registering wheels. This outward movement of the hand-lever releases the knife head $o^7$, which is held in an elevated position by a stud $o^{20}$, engaging with said hand-lever. The knife is thus permitted to drop down so as to allow the paper strip or ticket to pass between the knife and the block $o^{11}$, as the paper is fed forwardly by the backward movement of the swinging arm $g'$, in which case the pawl $o^{16}$, engages with the cable $o^4$, and revolves the feeding rolls. As the hand-lever $h$, returns to its normal position it comes in contact with the stud $o^{20}$, thus forcing the knife upwardly and severing the printed ticket or check which drops into a receiving box in front of and below the knife. The tickets or checks thus printed may be either employed for furnishing to the purchaser a ticket of the amount purchased to be paid to the cashier or they may be deposited in the receptacle provided for the purpose, and retained therein in the order in which they are deposited a suitable locking cover being provided for said receptacles so that a record of each purchase and the amount thereof is preserved.

The operation of the device as thus described is as follows: The depression of a key in any series withdraws the spring catch $a^4$, thus releasing the spring actuated cross bar $a^5$, and elevating the stop-pin $a^{12}$ and the indicator $a^{25}$. The cross bar $a^5$, contacts with the pivoted catch $b^2$, which holds the registering rack $b$, corresponding to that series of keys, the rack being held, however, in its normal position in engagement with the registering wheels by the holding fingers $f'$, and the actuating cross heads $e$. The depression of any key in any series releases the drawer, which is opened through the medium of the cable or cord $m'$, acted upon by the spring actuated drum $m$. The desired amount being thus indicated and the drawer opened, the amount so indicated is deposited in the drawer, the operator then takes hold of the hand-lever $h$, and draws it forward, carrying with it the cross bar $g$, and the swinging arms $g'$, until the beveled end $g^5$, of the hook $g^3$, engages with the projecting stud $g^4$, which releases said hook and permits the swinging arm $g'$, to return to its normal position through the action of the spring $g^6$. In returning to its normal position the bar $g$, contacts with the projecting finger $f^2$, turning the sleeve $f$, so as to elevate the holding finger $f'$, of the first registering device, thus raising the rack frame and bringing the rack of the first register into mesh with its registering wheel. As the rack frame is raised to a horizontal position the spring catch $k^3$, connected to said rack frame, is raised out of engagement with the spring on the cross head $e$, which moves forward until it contacts with the stud or pin $b^6$, on the side of said rack, and carries the rack back to its normal position, when it is again engaged by the catch $b^2$. A backward movement of said rack moves the registering wheel a number of notches corresponding to the number of key depressed. If, in the movement of the registering wheel of the first or units register, a sufficient number of units are indicated to make a unit of the next higher denomination, then the registering wheel of the next registering device or denomination is moved one notch through the medium of the cam-shaped projections $c'$, collars $c^2$, pivoted arm $c^3$, sleeve $c^4$, arm $c^5$, link $c^6$, lever $c^7$, pawl $c^8$ and spring $c^9$, the movement of the next succeeding wheel being limited to one notch by the action of the locking pawl $c^{14}$, as before described. As soon as the registration of the first registering device is completed, by the return of its rack to the normal position, the auxiliary shoe $e^7$, of said rack, is released by contact between the sliding cam block $e^{12}$, and the spring catch $k^4$, which permits said shoe to move in contact with the projecting pin $f^3$, of the next raising and holding device, which raises the succeeding rack frame, thus releasing its actuating cross head, repeating the operation of the first registering device. This operation is completed through as many devices as are employed, and any number may be employed. The last shoe $e^7$, of the series, operates through the medium of the extension $e^8$, and the pivoted lever $e^{10}$, to engage the projecting arm $a^{36}$, and carry said arm backwardly and downwardly, thus producing a downward movement of the transverse bar $a^{32}$, which returns all the cross bars $a^5$, and the respective stop-pins to their normal position, the arm $a^{36}$, being released and returned to its normal position by a spring $a^{37}$, when the pivoted arm $e^{10}$, contacts with the stud or pin $e^{13}$, the end of the pivoted arm being beveled so as to release the arm $a^{36}$, just before it reaches the limit of its backward movement. When any key in any series is depressed the pivoted cross bar $a^{13}$, is moved by the spring catch $a^4$, connected to said key, so as to withdraw the finger $a^{16}$, from contact with the locking bar $a^{19}$, said locking bar thus released being forced in contact with the remaining spring catches by the spring $a^{20}$ thus locking said spring catches and the keys against any further operation until the registration is completed, when, by the action of the pivoted link $a^{21}$, engaging with the bar $a^{23}$, connected to the hand-lever $h$, the locking bars are returned to their normal position. The movement of the registering racks in any registering device produces a corresponding movement of the printing wheels in the check device. A forward movement of the hand-lever produces a forward movement of the registering rack and thus a forward movement of the printing wheel corresponding to said rack. As the hand-lever $h$, approaches the limit of its forward movement the pivoted platen $n^7$, of the printing wheels is brought in contact with the paper under said wheels, thus printing a number thereon corresponding to the number indicated, as the swinging bar $g$, is released by the further movement of the hand-lever $h$, thus setting into operation the registering devices; the printing device is also released, the printing wheels returned to their normal position, the check containing the number is moved forward by the contact of the clamp on the swinging arm $g$, with the cable $o^4$, which operates the feed rolls. The severing knife is operated by the return of the hand-lever $h$, and the check severed and deposited in the receptacle adapted to receive the same. The drawer, having been opened by the depression of any key, is returned by the first forward movement of the hand-lever $h$, so that all the parts are in their normal position ready for a repetition of the operation.

If desired an auxiliary key for operating the drawer releasing mechanism, independent of the registering keys, may be employed, in which case all the parts remain in the normal position, the drawer being closed by the operation of the hand-lever, as before described, which prints and cuts off a check with a series of cipher or zero marks corresponding to the number of wheels in the device, the registering racks all being held in their normal positions by the pivoted catches $b^2$, which engage said racks. These blank checks thus printed furnish the means of determining how many times the drawer is opened and closed without registration.

It is obvious that various modifications of the device herein described may be employed without departing from the spirit of my invention. I do not, therefore, limit myself to the exact constructions shown and described, but

I claim as my invention:

1. In a cash register, a registering wheel and a series of keys, a reciprocating rack adapted to normally engage said registering wheel and hold it in its normal position, stop mechanism operated by the respective keys to limit the movement of said rack, when released, and an independent operating device, adapted, when operated, to release said rack from said registering wheel and permit it to be moved to the position determined by said stop mechanism, and means, substantially as described, for returning said rack to its normal position, thus moving said registering wheel during the movement of said operating device, substantially as specified.

2. In a cash register, a registering wheel and a reciprocating rack adapted to normally engage said wheel, a catch for locking said rack against longitudinal movement, a series of keys controlling a series of stop-pins to limit the movement of said rack, when released, each of said keys being adapted, when depressed, to unlock said rack, and an independent operating mechanism, adapted, when operated, to temporarily disengage said racks from said registering wheel and to return them to their normal position during the movement of said operating device, substantially as specified.

3. In a cash register, a registering wheel and a reciprocating rack normally in engagement with said wheel, a movable catch to hold said rack against longitudinal movement, a series of keys controlling a series of stop-devices adapted to limit the movement of said rack, when released, each of said keys being also adapted to operate said catch to unlock said rack, and an independent operating mechanism adapted, when operated, to release said racks from said registering wheels and permit them to move a distance determined by the said stop-pins, said operating mechanism being adapted, before the completion of its movement, to cause said racks to re-engage said registering wheels and return to their normal position, and thus move said wheel, substantially as specified.

4. In a cash register, a series of registering wheels and a rack for each of said wheels normally in engagement therewith, a movable catch for locking each of said racks against longitudinal movement, a series of keys for each registering wheel, each of said keys being adapted to control one of a series of stop devices to limit the movement of said rack and also to withdraw said movable catch from said rack, and independent operating mechanism adapted, when moved, to release all of said racks from the registering wheels and to permit such as are disengaged to move to the distance determined by said stop devices, and means, substantially as described, for reengaging said racks with said wheels and returning them to their normal position during the movement of said operating mechanism, substantially as specified.

5. The combination with a series of registering wheels and a reciprocating rack for each of said wheels, said racks being normally in engagement with said wheels, and a movable catch for normally engaging said rack, a series of keys for each of said racks, each adapted to operate one of a series of stop-pins and also to operate said movable catch, and independent operating mechanism adapted, when moved, to engage each of said racks from said registering wheel and permit a longitudinal movement thereof, a spring for actuating said rack against said stop-device and a spring actuated cross head forming a part of said operating mechanism, adapted, during the movement of said operating mechanism, to be forced against said rack and return it to its normal position and thus move said registering wheel, substantially as specified.

6. In a cash register a registering wheel and a reciprocating rack, a pivoted frame for supporting said rack, a supporting device for said frame to normally hold the rack in engagement with said wheel, a movable catch on said frame for holding said rack against longitudinal movement therein, and a spring for moving said rack, when disengaged by said catch, and a spring actuated crosshead normally in engagement with said rack, and a spring catch on said frame adapted to hold said cross head when moved out of engagement with said rack, said spring catch being adapted to be withdrawn from engagement with said cross head, when said rack frame is raised to its normal position, substantially as specified.

7. The combination with the registering wheel and the rack engaging therewith, the pivoted frame for supporting said rack, of the spring actuated cross head adapted to engage said rack, and the spring catch for engaging said cross head, said spring catch being adapted to be operated by said frame so as to disengage said cross head, when the frame is raised to its normal position, substantially as specified.

8. The combination with a series of registering wheels each having a reciprocating rack to engage therewith, a pivoted frame for supporting each of said racks, and a spring actuated cross head for operating each of said racks, means for raising and lowering said rack frame to cause said racks to engage or disengage said registering wheel, a spring catch operated by each of said frames, to engage and disengage said cross heads, and an auxiliary spring actuated shoe for each of said cross heads, adapted to be moved in one direction by said cross head, and an independent spring catch for retaining said shoe when so moved, a supporting device for each of said rack frames adapted to be operated by the spring actuated shoe of the next preceding rack frame, and means, substantially as described, for releasing the shoe of each rack frame when the cross head approaches the limit of its movement, substantially as specified.

9. The combination with the registering wheel and the reciprocating rack and the movable frame for supporting said rack, a movable support for said rack frame, and reciprocating cross heads adapted to operate said rack, a spring catch for retaining said cross head, adapted to be operated by the movement of said frame, an independent spring actuated shoe adapted to be moved in one direction by said cross head, a spring catch for retaining said shoe when moved by said cross head, and means on said cross head for operating said spring catch to release said shoe, during the movement of said cross head to its normal position, and means, substantially as described, for operating the next succeeding rack frame when the said shoe has returned to its normal position, substantially as specified.

10. In a cash register the combination with a reciprocating rack and a pivoted rack supporting frame, a movable cross head adapted to be engaged by a spring catch operated by the raising and lowering of said pivoted frame, a reciprocating shoe also operated by said cross head, and a spring catch for independently retaining said shoe, said spring catch being adapted to be operated to release said shoe during the movement of said cross head in returning to its normal position, substantially as specified.

11. In a cash register, two or more registering wheels and a reciprocating rack for each of said wheels, a pivoted rack frame for supporting each of said racks, a holding device for normally holding said frame, to cause its rack to engage with said wheel, a spring actuated operating device for each of said racks, adapted, when moved from its normal position, to release the rack frame of the next succeeding rack, and means, substantially as described, for returning said rack frame to its normal position after the spring actuating device of the preceding rack has completed its movement, substantially as specified.

12. In a cash register, the combination with a series of registering wheels and a reciprocating rack for each of said wheels, a pivoted rack frame supporting each of said racks, a supporting projection for each of said rack frames connected to the actuating mechanism of the next preceding rack, a spring actuated device for operating said rack, and an auxiliary operating device adapted to operate the holding projection of the next preceding rack frame, movable catches for engaging said spring actuating devices, the rack operating device being adapted to be disengaged by an upward movement of said frame and the auxiliary device being adapted to be disengaged by a forward movement of said rack operating device, substantially as specified.

13. The combination with the operating rack and its pivoted frame, a spring actuated cross head for said rack and a movable catch for engaging said cross head, said movable catch being connected to said frame so as to be withdrawn from said cross head by an upward movement of said frame, substantially as specified.

14. The combination, in a cash register, of a spring actuated cross head and a movable catch therefor, a spring actuated shoe normally engaged with said cross head having an independent spring catch, said shoe being provided with an engaging projection, adapted, as it approaches the limit of its movement, to operate the spring catch and disengage said shoe, substantially as specified.

15. The combination with a pivoted frame and a spring actuated cross head adapted to be engaged by a movable catch connected to said frame, a spring actuated shoe normally in engagement with said cross head and adapted to be engaged by a spring catch independent of said frame, and an operating projection on said cross head adapted to release said shoe when it approaches the limit of its movement, substantially as specified.

16. In a cash register, the combination with a series of registering wheels and a reciprocating rack for each of said wheels, a pivoted supporting frame for each of said racks and a series of spring actuated cross heads adapted to operate said racks, an auxiliary shoe normally connected to each of said cross heads and adapted to operate the rack frame of the next succeeding rack, a hand-lever adapted to simultaneously move all of said cross heads and said operating shoes, each of said cross heads being adapted, as it approaches the limit of its movement to its normal position, to release its auxiliary shoe, and thus cause the respective racks to be successively moved into engagement with their registering wheels and returned to their normal positions, substantially as specified.

17. The combination with a series of registering wheeels and a reciprocating rack for each of said wheels, a pivoted rack frame for supporting each of said racks, and a spring actuated cross head for operating each of said racks, a spring catch on each of said frames, and means connected to each of said frames to temporarily retain said spring actuated cross heads, an auxiliary spring actuated shoe normally in engagement with each of said cross heads and adapted to actuate the next preceding rack frame to cause its rack to be moved out of or into engagement with its registering wheel, a retaining device for said shoe independent of said rack frames, and means on each of said cross heads for operating said shoe retaining devices, each of said operating cross heads being adapted to be released and operate its rack, when the rack supporting frame is elevated, substantially as specified.

18. In a cash register, a series of keys and a series of stop-pins, one for each key, adapted to determine the movement of the registering devices, each of said stop-pins being supported on a spring actuated cross bar perforated at each end to receive stationary guiding bars, substantially as specified.

19. A series of keys and series of spring actuated stop-pins, one for each key, a spring catch connected to each key, adapted to engage its stop-pin, a spring actuated pivoted bar arranged adjacent to said spring catches, and a locking device for said bar, adapted, when one catch is operated, to release said locking bar and cause it to engage all the catches of said series, substantially as specified.

20. In a cash register, the combination with a series of registering wheels and a reciprocating rack for each of said wheels, a pivoted rack frame for each rack, a series of spring actuating devices normally in engagement with said racks, and a transverse bar adapted to engage all of said spring actuating devices, a hand-lever normally connected to said bar, and means for disconnecting said hand-lever from said bar, when it is moved to the forward limit of its stroke, a spring for returning said bar to its normal position, and means, substantially as described, for releasing the respective spring actuating devices in successive order, when said bar returns to its normal position, substantially as specified.

21. The combination with a series of registering devices each having a reciprocating rack and spring actuating devices therefor, an auxiliary device in each of said registering devices, adapted, as the rack of one registering device approaches the limit of its movement, to set into operation the actuating device of the next succeeding registering mechanism, an operating bar adapted to engage all of said actuating devices when moved in one direction, and means, substantially as described, for releasing the first of said actuating devices, when the operating bar is returned to its normal position, substantially as specified.

22. In a cash register, a series of registering devices, each having a registering wheel and an operating rack, a pivoted rack supporting frame, movable supports for normally holding said rack frames to cause said racks to engage with said wheels, spring actuating devices for operating each of said racks, and means, substantially as described, for operating the rack frame of one registering device when the next preceding one has been operated by its spring actuating device, an operating lever for simultaneously moving all of said actuating devices in one direction, and means, substantially as described, for releasing the actuating device of the first series when said lever has reached the limit of its forward movement, substantially as specified.

23. The combination with a series of registering devices and a reciprocating rack for each of said devices, a series of printing wheels, one for each registering device and stop devices adapted to determine the movement of each of said racks, when released, spring actuating devices for returning said racks to their normal position and thus moving said registering wheel, and a movable platen adapted to be brought into contact with said printing wheels after said registering racks have been released and prior to the time they are returned to their normal position, substantially as specified.

24. In a cash register, a normally closed cash receptacle and a series of registering devices, a series of keys each adapted to release said cash receptacle and to determine the movement of the registering devices, and a hand-lever for operating said registering devices when so released, a spring actuated drum having a cable thereon, connected at each end to said cash receptacle and adapted to open the same when released by said keys, and a connection from said hand-lever to said drum, whereby said drum is caused to revolve and thus close said cash receptacle, as said hand-lever is operated to operate the registering devices, substantially as specified.

25. In a cash register, a registering device, consisting of a series of registering wheels, and a printing device having a series of printing wheels, one for each registering wheel, and means for connecting said registering and printing wheels, a hand-lever for operating said registering devices, a movable platen forming a portion of said printing device, and a connection from said hand-lever to said platen to cause said platen to be operated during the operation of said registering mechanism, substantially as specified.

26. The combination with the registering wheels and the reciprocating racks, the printing wheels connected directly to said registering wheels, stopping mechanism operated by a series of keys to determine the movement of said racks and also of said printing wheels, spring actuated mechanism for operating said registering wheels through the medium of the reciprocating racks, a movable bar adapted to simultaneously withdraw all of said spring actuating devices, and a movable platen adjacent to said printing wheels, and a direct connection from said movable bar to said platen, whereby said platen is operated against said printing wheels as the reciprocating racks reach the limit of their forward movement, substantially as specified.

27. In a cash register and indicator, a series of printing wheels connected to the registering devices, a movable platen adjacent to said printing wheels, feeding rolls adjacent to said printing wheels, an endless belt or cable connected to one of said feeding rolls, an operating mechanism to operate the registering devices, and a clutch on said operating mechanism adapted to operate said endless cable, whereby the feeding rolls are caused to advance at each movement of the registering devices, substantially as specified.

28. The combination with the printing wheels, the movable platen, feeding rolls, and a cutting knife, an endless cable connected to said feeding rolls, a swinging bar carrying a clutch device adapted to engage said cable, a link connection from said swinging bar to a hand-lever, an engaging projection on said link adapted to operate said platen, and an engaging projection on said knife adapted to be engaged by said handle, substantially as specified.

29. The combination with the swinging bar, the feeding rolls, and the endless cable connected to said rolls, a portion of said cable moving laterally across the path of the swinging bar, a sliding head on said bar, a pivoted pawl and an engaging projection on said sliding head, said pawl and projection being adapted to rest on opposite sides of said cable and engage the same when the bar is moved in one direction, whereby a lateral movement of the cable is produced by a swinging movement of said bar, substantially as specified.

30. The combination with a series of registering devices and a printing wheel, one for each registering device, means for connecting said printing wheels to said registering device, a series of keys for each registering device adapted to determine the movement of said registering device and of the printing wheel connected thereto, a normally closed cash receptacle adapted to be released by each of said keys, a spring actuated drum connected through the medium of a cord or cable to said drawer, a pivoted hand-lever connected respectively to said registering device, said printing device and said spring actuated drum, so that a movement of said hand-lever shall produce an operation of said registering devices, the printing device and of said drawer, substantially as specified.

31. In a cash register, a series of keys and a series of spring catches, one for each key, connected thereto, a spring actuated cross bar adapted to be engaged by each of said spring catches, a stop-pin on said cross bar, a spring actuated supporting finger adapted to be operated by the movement of each of said spring catches and moved in contact with said spring catches when the key is depressed, and thus lock all the keys in the series, substantially as specified.

32. The combination with a series of stop-pins and their operating devices, of a series of keys one for each stop-pin, and spring catch connected to each key, a spring actuated supporting finger adapted to be moved by each of said spring catches, and a locking bar normally supported by said finger, said locking bar being adapted to be disengaged and be moved in contact with said spring catches, when said finger is moved, and means, substantially as described, for returning said locking bar to its normal position, substantially as specified.

33. The combination with the registering wheel and the reciprocating rack normally in engagement therewith, a pivoted rack frame for supporting said rack, and a pivoted catch on said rack frame, adapted to normally engage with said rack, a series of spring actuated cross bars, each adapted, when released, to engage said catch, and each provided with a stop-pin adapted to limit the movement in one direction of said rack, spring actuated mechanism connected to an operating handle, adapted, by a movement of said handle, to be set into operation, so as to successively release said racks and return them to their normal position, and means, substantially as described, for returning the cross bars and the stop-pins to their normal position, after the respective racks have completed their movement, substantially as specified.

34. The combination with a registering wheel and a reciprocating rack, a pivoted rack frame for supporting said rack and a movable support for said rack frame, adapted to normally support it with the rack normally in engagement with said registering wheel, a pivoted arm connected to said rack frame and a pivoted pawl on said arm, said pivoted pawl being adapted, when said rack frame is released, to engage said registering wheel and limit the movement thereof, substantially as specified.

35. The combination with the reciprocating rack and the registering wheel, a rack frame supporting said rack, a pivoted arm connected to said rack frame, a pivoted pawl having a limited movement between stop projections, adapted, when said rack frame is released, to engage the teeth of said registering wheel, whereby a limited movement only of said registering wheel is permitted when said rack is disengaged therefrom, substantially as specified.

In testimony whereof I have hereunto set my hand this 21st day of July, A. D. 1892.

HARRY M. NEER.

Witnesses:
FRANK WATT,
H. O. OSTER.